United States Patent [19]

Seetaram

[11] 3,709,089
[45] Jan. 9, 1973

[54] CAPTIVE FASTENING ELEMENT

[76] Inventor: Roy Seetaram, 123 Thistledown Boulevard, Ontario, Canada

[22] Filed: Dec. 9, 1970

[21] Appl. No.: 96,381

[30] Foreign Application Priority Data

Oct. 5, 1970 Canada..................................094976

[52] U.S. Cl. ..............................85/77, 85/83, 85/85
[51] Int. Cl................................................F16b 13/06
[58] Field of Search............85/85, 77, 79, 75, 73, 74, 85/83

[56] References Cited

UNITED STATES PATENTS

| | | | |
|---|---|---|---|
| 3,448,651 | 6/1969 | Passen | 85/77 |
| 3,277,770 | 10/1966 | McCulloch | 85/77 |
| 2,440,038 | 4/1948 | Baker et al. | 85/79 |
| 2,404,928 | 7/1946 | Schutten | 85/83 |
| 3,523,482 | 8/1970 | Ploch et al. | 85/79 |
| 2,143,086 | 1/1939 | Pleisten | 85/67 |

FOREIGN PATENTS OR APPLICATIONS

| | | | |
|---|---|---|---|
| 1,954,077 | 5/1970 | Germany | 85/77 |
| 260,890 | 5/1963 | Australia | 85/79 |

*Primary Examiner*—Edward C. Allen
*Attorney*—Neill M. S. Johnston

[57] ABSTRACT

This specification discloses a captive fastening element of the type which is designed to fit into a hole drilled in concrete of the same size as the element itself, and having a blind end having a reduced diameter neck and tapering outwardly again from that neck, and being provided with a single one piece wedging collar around the reduced neck having a single split down one side thereof permitting the internal diameter of the collar to be expanded by the wedging action of the tapered end. Preferably the one piece collar incorporates one or more struck out tongues adapted to engage the insides of the walls of the hole drilled in the concrete bed and hold the same in position.

10 Claims, 10 Drawing Figures

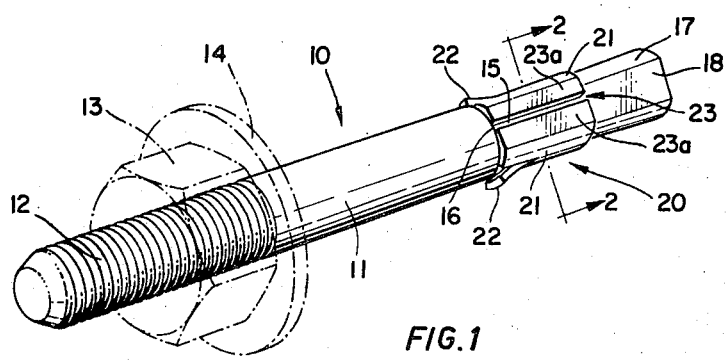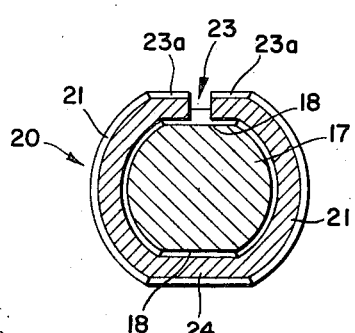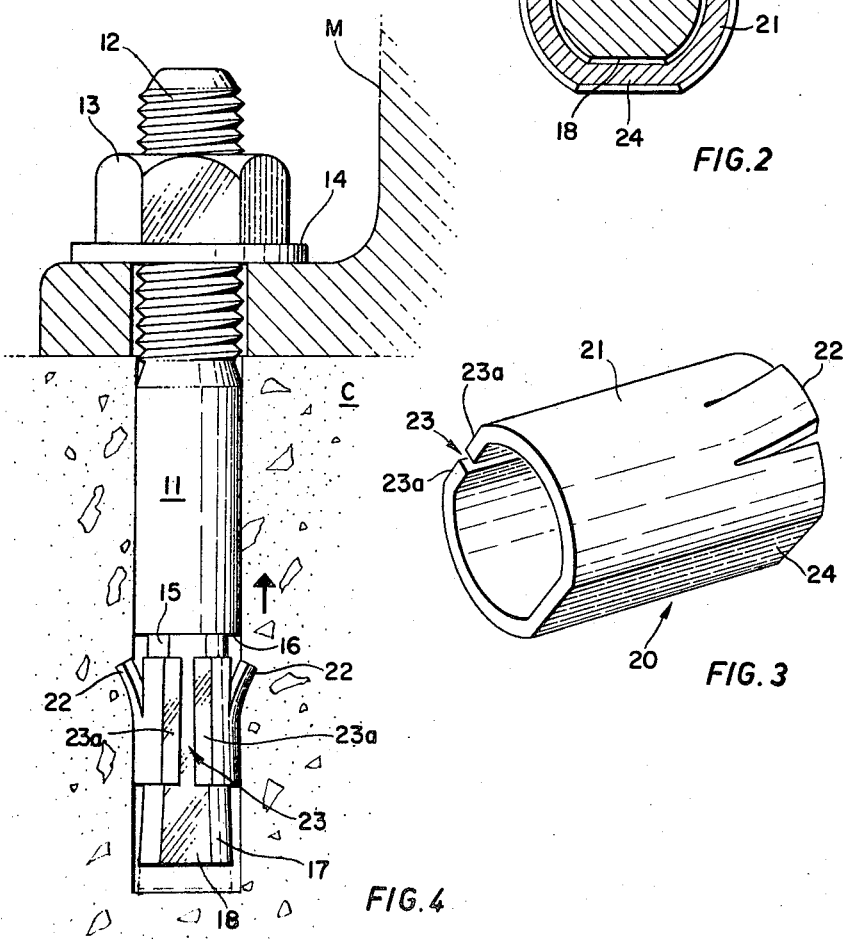

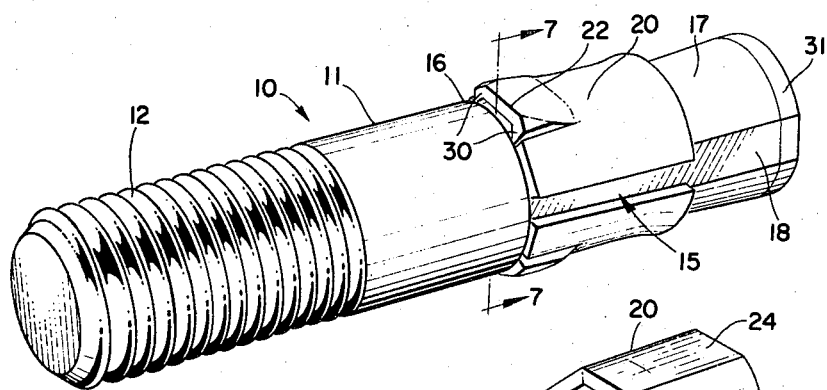
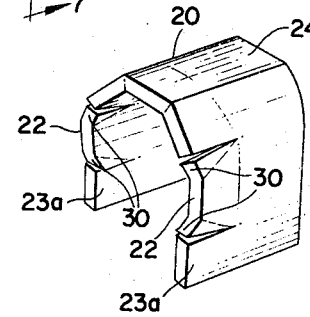
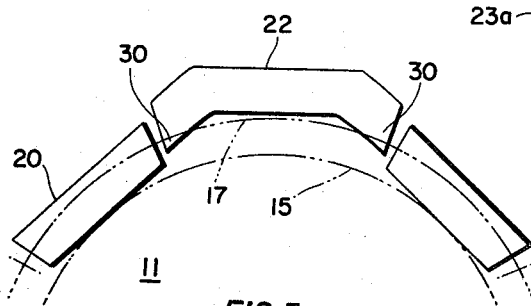
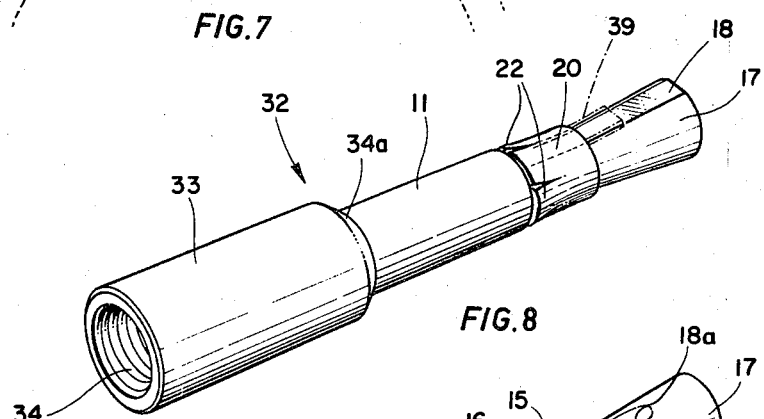
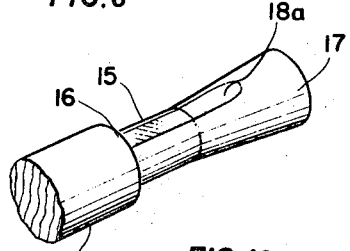
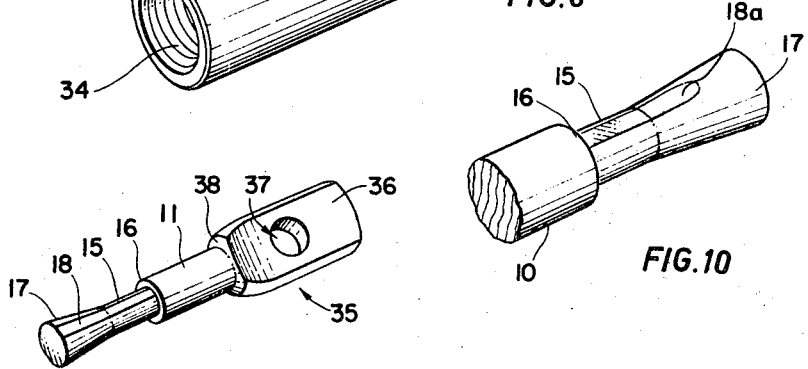

CAPTIVE FASTENING ELEMENT

The present invention relates to a captive fastening element or bolt device adapted for inserting into a hole drilled in concrete, stone, brick or the like material, into which the bolt is inserted, the bolt incorporating anchoring means which is adapted to anchor one end of the bolt inside the hole, so that some article may be attached to the other end of the bolt extending from the hole.

BACKGROUND OF THE INVENTION

It is frequently desirable to anchor articles to a concrete floor, or to a stone or brick surface, or some other surface in which it is impossible to drill a hole entirely through the surface and out of the other side so that a bolt may be fastened in the conventional manner. Typical examples of such fastenings as may be required are fastening of heavy machinery to concrete flooring or beds, fastening of electrical or air-conditioning fixtures beneath precast or poured in place concrete ceilings, fastening of gates or electrical fittings for the exterior of buildings, and an enormous number of other applications for such fastenings arise in day to day construction requirements. In the past, there have been some such captive bolts in which a hole was drilled in the concrete or other bed which was considerably oversized with respect to the bolt. A captive threaded fastening means was then hammered down into the lower end of the hole and fastened in position by hammering it over a cone-shaped plug, after which the bolt would then be inserted into the threaded anchoring means and an attempt was made to pull it up tight. However, these devices were particularly subjected to continual shaking stresses such as would be imposed by the fastening of machinery on a concrete bed. The anchoring device at the lower end of the hole would gradually tend to work loose off its cone and in time the bolt would become free.

Another and entirely different principal of operation for providing a captive bolt is the system in which a hole is drilled in the bed precisely the same size as the bolt, and in which the blind end or inner end of the bolt is of reduced diameter, and incorporates some form of fastening or wedge. One example of a somewhat complex and expensive device of this class is one in which the blind end of the bolt is of reduced diameter and tapers outwardly into an enlarged lower end and incorporates two wedge-shaped fastening devices, and two operating rods extending up either side of the bolt, and coming into contact with the inner end of the nut or other fastening means at the outer end or free end of the bolt. As the nut or fastening means was screwed home the two rods were pushed down either side of the bolt, and the two wedge-like device were pushed out into contact with the adjacent sides of the hole in the concrete bed. While this device was within certain limits somewhat more effective than the other class of devices requiring the use of an oversized hole in the concrete bed, they were excessively expensive and had to be made up in a variety of special sizes, and in some cases it required an excessive number of turns of the nut before the wedge-like device actually held the blind end of the bolt firmly in position, with a result that an excessive proportion of the length of the bolt was pulled out of the hole, with a result that the bolt tended to grip too close to the surface, and might pull out with resulting splintering or breakage of the concrete around the hole.

Another and somewhat more effective type of captive bolt in the same class, in which the hole drilled in the bed is of the same size as the bolt, as that shown in Canadian Pat. No. 766,493. In this device, the bolt is provided with a blind end of reduced diameter tapering outwardly, and two or more separate semicylindrical wedge-members are placed around the portion of reduced diameter, with struck-out tongue members extending outwardly therefrom so as to grip the sides of the hole in the concrete. Some simple form of fastening or locating means such as a piece of adhesive plastic tape or the like was placed around the two separate wedge members to hold them in position while the bolt was being handled and inserted in the hole. In operation this type of bolt required the drilling of a hole the same size as the bolt, and the bolt and its two or more wedge members was then hammered down into the hole, this hammering process flexing the tongue members inwardly so as to permit the same to move down the hole. When hammered fully home, the bolt was then drawn up tight by means of a nut or the like, and as soon as the bolt started to be drawn upwardly out of the hole, the wedging effect of its tapered blind end came into contact with the wedge members, and forced them into contact with the adjacent sides of the concrete hole causing a binding or locking effect, after which the bolt could be drawn up tight. This procedure did not always work out in practice however. In many instances, the handling of this type of bolt involving two or more wedge members became excessively clumsy, especially in cold weather. For example, when fastening a piece of heavy machinery down in position on a concrete bed, the normal procedure using this latter type of bolt, was first of all to place the piece of machinery in position, then mark out the position for the four holes, drill the four holes out, then move the piece of machinery away, insert the bolts and their pairs of wedge members into the holes and ensure that they are going to draw up tight, and then replace the piece of machinery in position over the bolts. This procedure was usually necessary since it was essential to ensure that both the wedge members entered the concrete hole in the correct position. Although in some cases it was possible to insert the bolts and their wedge members while the piece of machinery was in position, provided the wedge members were held securely by a piece of plastic tape or the like, in many cases in practice it was found that this procedure resulted in one or more of the wedge members become dislodged, since the piece of machinery itself prevented the workmen from getting access directly to the surface of the concrete around the holes. Another and much more serious disadvantage was the fact that with this type of bolt, it was found that as tension began to be applied to the bolt by means of tightening the nut, the bolt itself would start to rotate in the hole instead of simply pulling up tight against the wedge members as a result although the wedge members were held firmly in position by their struck out tongue, and could not come out of the hole, it was still impossible for the bolt to be tightened down firmly and hole the piece of machinery in position, because the bolt simply rotated along with the nut. In order to overcome this, workmen resorted to various expedients including for example gripping the top of the bolt with a pair of pliers or some form of vice-like device, and inserting a screw driver underneath the washer or the like. These various expedients were usually more or less successful, in the end, but substantially increased the difficulty of use of this type of bolt, and lead to an unnecessary waste of time and effort.

A further disadvantages of prior art fastening elements of this type was that in general they could only be used in association with a threaded device such as a nut, which applied continuous traction along the axis of the bolt so as to maintain the wedge members in firm engagement with the inside walls of the hole in the concrete. Such devices were therefore unsuitable for use in fastening or supporting female threaded fastening elements for example, or other fastening elements or hanger devices, such as are used in the erection of certain plumbing and air-conditioning fixtures, and acoustic ceiling systems, in which a intersecting network of T-shaped support rails are supported by lengths of wire from hangers fastened to the underside of the poured concrete ceiling in a building.

BRIEF SUMMARY OF INVENTION

Accordingly the present invention seeks to provide an improved form of captive fastening element or bolt of the type which is designed to fit into a hole drilled in concrete of the same size as the bolt itself, and having a blind end having a reduced diameter neck and tapering outwardly again from that neck, and being provided with a single one piece wedging collar around the reduced neck having a single split down one side thereof permitting the internal diameter of the collar to be expanded by the wedging action of the tapered end, and the one piece collar incorporating one or more struck out tongue adapted to engage the insides of the walls of the hole drilled in the concrete bed and hold the same in position.

Preferably, the tapered end of the element is provided with at least one and preferably two flats on opposite sides thereof, and the one piece collar is provided with corresponding flats adapted to overlie the flats on the tapered end, and in this way, rotation of the element relative to the wedging collar is prevented.

More specifically, the invention will provide a captive bolt of the type described above incorporating a single one-piece wedging collar split down one side and incorporating two flats, one along the line of the longitudinal split, and the flat being on the opposite side of the collar, and the collar further incorporating at least one and preferably two struck-out tongue members extending outwardly so as to engage the sides of the hole drilled in the concrete bed.

It is a further and related objective of the invention to provide a fastening element having the foregoing advantages which may be provided with a variety of different attachment means on the outer end, such attachment means including a male threaded member for attachment of a nut, a female threaded socket member, or a hang tab with any suitable form of fastening means thereon such as a hole passing therethrough.

Further and other advantages will become apparent from the following description of a preferred embodiment of the invention which is given here by way of example only with reference to the following drawings in which like reference devices refer to like parts thereof throughout the various views and diagrams and in which;

BRIEF DESCRIPTION OF THE DRAWINGS

FIG. 1 is a perspective illustration of a bolt according to the invention, showing a nut and washer in phantom;

FIG. 2 is a section along the line 2—2 of FIG. 1;

FIG. 3 is a greatly enlarged perspective illustration of the wedging collar on the nut shown in FIG. 1;

FIG. 4 is a sectional side elevational view of a portion of the concrete bed, showing the bolt of FIG. 1 in position therein, after having been tightened down on a piece of heavy machinery or the like, and having moved relative to the wedging collar, into its bolt locking position;

FIG. 5 is a perspective illustration of a fastening element showing a further embodiment of the invention designed to provide improved holding and gripping power;

FIG. 6 is an opened up perspective illustration of the wedging collar according to the invention shown prior to assembly with the fastening element;

FIG. 7 is an endwise elevational view of a portion of a fastening element of FIG. 5, shown along the direction of the arrow 7—7, with the fastening element itself shown thereon in phantom;

FIG. 8 is a perspective illustration of a further embodiment of fastening element, and showing in phanton a modified form of wedging collar thereon;

FIG. 9 is a perspective illustration of a further form of fastening element, shown in this case without any wedging collar thereon, and, FIG. 10 is a partial perspective of the tapered end portion of any one of the fastening elements, and showing a preferred form of construction, without the wedging collar shown thereon.

DETAILED DESCRIPTION OF A PREFERRED EMBODIMENT

Referring now to the illustrations, it will be seen that the fastening element comprises a bolt generally referenced as 10 having a smooth shank portion 11, outer threaded end portion 12 adapted to receive a locking device such as a nut 13, and a washer 14. At its inner or captive end, the bolt 10 will be seen to be provided with a reduced neck portion 15, separated from the shank portion 11 by a shoulder 16, and from the reduced neck portion 15, the end of the bolt 10 tapers outwardly to an enlarged captive end 17. On either side of the reduced neck 15 and the tapered end 17, there are provided the flats 18.

Preferably, although not essentially, the reduced neck portion 15 is of cylindrical shape, substantially as shown in FIG. 10, the outwardly tapering end portion 17, commencing its taper from the lower end of the cylindrical neck portion 15.

The wedging collar is indicated by the general reference arrow 20 and will be seen to comprise the two generally semi-cylindrical side portions 21, each of which is provided with an outwardly directed struck-out tongue 22. The collar 20 is a one-piece member which is provided with an open slot 23 on one side thereof the opposed side being closed. The wedging collar 20 is provided with flattened portion 23a on either side of the open slot 20, and a corresponding flattened portion 24 on the opposite side thereof. Both the flattened portion 23a and the flattened portion 24 overlie corresponding flats 18 on the tapered captive end 17 of the bolt 10. In this way, any possibility of the collar 20 rotating relative to the tapered end 17 is prevented.

In operation, a hole is drilled into a concrete bed indicated in FIG. 4 as C, the hole corresponding more or less precisely to the diameter of the shank portion 11 of the bolt 10. This hole may of course be drilled while the machinery indicated as M is in its final position, simply by passing the drill bit through the hole provided in the piece of machinery and drilling directly into the concrete C. There is no requirement for moving the piece of machinery away. Once the hole has been drilled to an adequate depth the captive end 17 of the bolt 10 is then inserted into the hole, and the bolt 10 may then be hammered into position. The wedging collar 20 is preferably made of sheet metal equal to about the depth of the shoulder 16 so that it may readily pass into the hole drilled in the concrete C. Obviously, the struck-out tongues 22 will contact the sides of the concrete C around the hole, but they will be flexed inwardly without too much difficulty as the bolt 10 is hammered further into the hole. When the bolt 10 has been hammered into a sufficient depth, so that three or four threads remain above the piece of machinery M, then the washer 14 and nut 13 are attached to the threaded portion 12, and tightening down of the bolt may be commenced. As soon as any tension is applied to the bolt in this way, the entire bolt 10 will attempt to rotate. However, at this point it will be found that rotation is prevented by the wedging collar 20. It will be appreciated that the struck-out tongues 22 will be in fairly firm engagement with the concrete C on the sides of the hole, and any rotation of the collar 20 relative to the concrete C will be fairly difficult to achieve. Similarly, it will be appreciated that the collar 20 will not rotate relative to the tapered end 17 of the bolt 10, due to engagement of the flats 18 with the flat portions 24 and 23a on the wedging collar 20. Thus the entire bolt 10 is held more or less securely against rotation. Obviously, if the threads 12 of the bolt 10 are burred, or covered with dust or rust, such that there is excessive friction created when it is attempted to rotate the nut 13, then obviously there may come a point at which the struck-out tongues 22 will start to cut into the concrete C and slide around in the hole. However, in the vast majority of cases this will not occur, and the nut 13 will continue to rotate relative to the threads 12 thereby applying increasing tension on the bolt 10. As the bolt 10 is thus drawn out of the concrete C, the wedging collar 20 will be unable to move with it, and the tapered end portion 17 will move upwardly relative to the collar 20. This will have the effect of expanding the collar 20 by widening the slotted opening 23, and eventually bringing the collar 20 into contact with the sides of the concrete around the hole, and produce a locking or binding action which will finally prevent the tapered portion 17 from being withdrawn any further. At this point, the nut 13 can then be tightened very firmly down against the holding effect of the collar 20 without any danger whatever of the collar 20 pulling loose. In fact, the more the nut 13 is tightened, the tighter will be the grip of the collar 20 on the inside of the hole in the concrete, and the tighter will be the holding effect of the entire bolt. Thus notwithstanding a violent shaking or vibration of the machinery M, the bolt 10 will continue to hold firmly in position over a lengthy working life without retightening. In addition, it is noted that by means of this invention, the insertion of the bolt 10 will be found to be greatly facilitated. Thus collar 20 will be at all times captive on the reduced neck 15 of the bolt 10. Since a collar 20 is of one-piece construction, it cannot ever be removed, and will not require special handling either by means of some form of plastic tape or other fastening means and will not require to be held in the fingers of the workman, thereby greatly facilitating its use when the bolt 10 must be inserted through a portion of machine M, as shown in FIG. 4, or when used in cold weather in exterior locations.

In addition, it is noted that by the practice of the invention, which incorporates a single one-piece construction for the collar 20, it now becomes possible to provide the flats 24 and 23a on the collar 20 which effectively prevent rotation relative to the bolt 10. The provision of such flats was not possible in the case of a collar 20 having two or more parts, since in this case, such two or more parts would fit only relatively loosely around the tapered portion 17 of the bolt 10, and the provision of means such as the flats 18 and 24 and 23a in the present invention would be completely ineffective.

In addition, the location of the tongues 22 of the present collar 20 is of importance. Such tongues are on the upper or outermost edge of the collar 20 and are directed outwardly. Thus while the tongues 22 can flex while going in, they provide a firm locking effect preventing outward movement and ensure positive binding action of the collar 20 and tapering portion 17 against the sides of the hole.

While the foregoing fastening element is found to operate satisfactorily in the vast majority of cases, in some cases, especially where for example, the concrete is very hard, the tongues 22 while they are being forced downwardly into the hole are flexed beyond the elastic limit of the metal, and become permanently flattened, and no longer have the resiliency to spring outwardly into engagement with the concrete as soon as tension is applied to the bolt. As a result, it is found that in some cases the bolt may either be liable to rotate as the fastening device such as the bolt or other fastening devices is tensioned, or the bolt may even pull out altogether. In order to overcome this, a modified form of collar 20 may be provided as shown in FIGS. 5, 6 and 7. In FIG. 5, the bolt 10 is illustrated as before, with the reduced neck portion 15 and the outwardly tapering portion 17 and the flats 18 thereon. The collar 20 is essentially the same as the collar 20 of the embodiment of FIG. 1, and is provided with struck out tongues 22 as shown. However, in this case it will be noted that the struck out tongues 22 are somewhat wider than the tongues 22 shown in FIG. 1, and are bent downwardly at each corner so as to provide the downwardly directed prong members 30. The formation of the prong members 30 is such that as the bolt is formed into the hole, and the tongue 22 is flexed alongside the reduced neck portion 15, the two prongs 30 of each tongue 22 will contact the surface of the reduced neck 15 before the remainder of the tongues 22. Any further compressive force applied to the tongues 22 to attempt to press them flatter against the reduced neck portions 15, will thus be resisted not merely by the junction between the tongues 22 and the collar 20, but also by the engagement of the prongs 30 with the reduced neck 15. Thus as still further increased pressure is applied, it is possible that the prongs 30 may flex outwardly slightly, so as to permit the tongues 22 to lay flatter against the neck 15, but it is found that such further flexing will not overcome in the majority of cases the elastic limit of the metal, and as soon as any attempt is made to apply tension to the bolt 10 to pull it out of the hole, the inherent resiliency incorporated in such prongs 30 will cause them to spring together, thereby providing a camming action against the cylindrical services of the neck 15, and forcing the tongues 22 outwardly causing them to bite into the concrete.

A further effect is believed to occur, as the tongue 22 bites further into the concrete. Thus the entry of the tongue 22 into the concrete will displace a certain amount of the concrete, and concrete dust and particles will enter between the tongue 22 and the neck 15 which will accumulate there and tend to force the tongue 22 further outwardly into the concrete, and this effect is believed to be enhanced by the use of the inturned prongs 30, which tend to trap such particles in this position.

In circumstances where a very heavy tension is applied to the bolt or other fastening element, then it has been known under extreme pressure for the enlarged end of the tapered end portion 17 to become knurled over, allowing the collar 20 to slip off the tapered end portion 17 and permitting the bolt 10 to be released.

In order to overcome this problem, in bolts or fastening elements or larger sizes, it is found desirable to form the terminal portion 31 of the tapered end 17 in a cylindrical manner, the diameter of such cylindrical portion 31 being the same as the diameter of the shank of the bolt 10. Such an additional cylindrical terminal portion is found to effectively prevent the collar 20 from slipping off the end of the tapered end 17.

As stated above, the invention will be found to have application both to relatively conventional captive bolts such as those illustrated in FIGS. 1 and 5, but, unlike prior captive bolt devices, is also found to be applicable to other forms of fastening elements, as shown in FIGS. 8 and 9.

Referring now to FIG. 8, the fastening element there shown indicated generally by the reference arrow 32 will be seen to comprise, as in the case of the bolt 10, a cylindrical shank portion 11, a tapered end portion 17, flattened portions 18, a collar 20 and tongues 22, all of which may be made as described above, with or without the modifications of FIGS. 5, 6 and 7, depending upon the particular circumstances.

Unlike the bolt 10 illustrated above however, the fastening element 32 is provided with an enlarged cylindrical boss portion 33, the interior of which is drilled and provided with internal threads 34 for reception of any other bolt or other fastening device.

In the operation of this embodiment, the hole in the concrete or other bed material is drilled to the diameter of the shank 11. The fastening element is then driven into the hole, and it will be obvious that the boss 33 cannot be driven into such hole, it being only of a diameter sufficient to accept the shank 11. In order to wedge the collar 20 into its position in which it holds the tapered end portion 17 within the hole, a screwdriver, or the claw portion of a hammer, or any other suitable such tool, is applied under the shoulder 34 of the boss portion 33, and the fastener element 32 is pried partially out of the hole. Obviously, such outward movement will cause the tongues 22 to bite into the concrete, and cause the collar 20 to be expanded, by movement of the tapered end 17 relative thereto, in jamming engagement with the sides of the hole, afterwhich further outward movement is prevented. Whatever fastening devices being employed (not shown) may then be connected with the female threads 34, and in fact, in a great many cases, such fastening element 32 is found to be perfectly secure, although all it is doing is merely supporting the weight of some object connected to the threads 34, such as a plumbing or air-conditioning fixture (not shown).

A still further form of fastening element is shown in FIG. 9, which again, incorporates the same basic features as the bolt 10 and the fastening element 32. In this case, however, on the outer end of the shank 10, there is provided a flattened attachment tongue 35, provided simply with a hole 36 therethrough to receive for example a piece of wire (not shown) holding up a portion of a modular ceiling system for example. A shoulder 37 will prevent the entry of the tongue member 35 into the hole, which is drilled only to the size of the shank 11, and the shoulder 37 permits the fastening element 35 to be pried partially out of the hole, in exactly the same manner as in connection with the element of FIG. 8.

In certain cases, the diameter of the shank 11 and the tapered end portion 17 may be so small, that the available area for the flattened portions 18 on either side thereof becomes insufficient to provide a adequate binding effect with the collar 20, to prevent the collar 20 from rotating around the tapered end portion 17.

Accordingly, it may possibly be desirable, to provide an extended tail member 39 shown in phantom in FIG. 8, of flattened form, which is designed to lie along one of the flattened portions 18, and provide an increased binding effect preventing the collar 20 from rotating.

In some cases to still further improve the pull-out resistance of the fastening element, the flat portions 18 may be modified as shown by the flat portions 18a in FIG. 10. The portions 18a do not extend up the entire extent of the tapered end 17 and leave the outermost portion thereof of cylindrical shape in section.

The foregoing is a description of a preferred embodiment of the invention which is given here by way of example only. The invention is not to be construed as limited to any of the specific features as described, but comprehends all such variations thereof as come within the scope of the appended claims.

What I claim is:

1. Captive fastening element apparatus of the type adapted to be inserted into a receptacle such as a hole drilled into a bed of solid material such as concrete or the like and comprising;

a shank portion of uniform cylindrical section of predetermined diameter;

an outer end portion on one end of said shank adapted to extend outwardly from said bed;

engageable means on said outer end whereby a longitudinal force can be applied to said shank tending to draw same out of said bed;

a tapered axially extending inner end of generally circular cross-section on the other end of said shank, of reduced diameter adjacent to said shank portion gradually enlarging toward the free end thereof:

a single locking band member having two ends, and having a thickness approximately equal to the difference in radius between said shank portion and the thinner region of said generally circular cross-section tapered inner end, formed into a generally cylindrical shape, said two ends of said band defining a slotted opening therealong permitting said band to be expanded, by relative movement of said tapered inner end, into engagement with said bed;

outwardly oriented tongue means on said locking band member, said tongue means being resilient, and being adapted to be squeezed against said generally tapered end, while same is being inserted, into said receptacle and being urged into engagement with said bed, whereby to prevent removal therefrom or rotation relative thereto, and at least one generally flattened surface portion formed along at least part of said generally circular cross-section tapered inner end, and a corresponding flattened portion formed on said locking band member, overlying said flattened surface portion of said tapered end, thereby preventing relative rotation between said band member and said tapered end.

2. Captive fastening element apparatus as claimed in claim 1 wherein said outer end portion is of enlarged diameter relative to said shank portion, and including recess means therein, and internal threads formed within said recess for reception of a threaded fastening means therein.

3. Captive fastening element apparatus as claimed in claim 1 wherein said outer end portion comprises an enlarged flattened tongue member, having at least one width dimension greater than the diameter of said shank portion, whereby the same is prevent from entering into a hole for said shank portion, and including attachment means defined by said tongue member.

4. Captive fastening element apparatus as claimed in claim 1 including a cylindrical terminal portion at the free end of said tapered end portion, the diameter thereof corresponding more or less to the diameter of said shank portion.

5. Captive fastening element apparatus as claimed in claim 1, wherein said outer end portion is threaded for engagement by a nut adapted to be threadedly engaged therewith.

6. Captive fastening element apparatus as claimed in claim 1 wherein said locking band has outer and inner edges, and wherein said tongue means comprise at least two struck out tongue members formed in said band at said outer edge, on opposite sides thereof, said tongue members extending outwardly from said band and being resilient enabling them to flex inwardly upon insertion into a receptable, and being urged into engagement therewith to prevent withdrawal therefrom.

7. Captive fastening element apparatus as claimed in claim 6 including inturned prong means on said tongue means directed toward said tapered end, and adapted to contact and engage the same when said tongue means are flexed thereagainst, and resiliently engage the same, and urge said tongue means away therefrom.

8. Captive fastening element apparatus as claimed in claim 6 including a flattened tail member extending from said inner edge of said band and lying along said flattened surface portion of said tapered end.

9. Captive fastening element apparatus as claimed in claim 6 including two said flattened surface portions on said tapered end, on opposite sides thereof, the contour of said tapered end being arcuate between said flattened surface portions, and including two corresponding flattened portions on said locking band overlying the same.

10. Captive fastening element apparatus as claimed in claim 1 including a reduced neck portion of generally cylindrical shape, extending between said shank portion and said tapered end, said locking band being arranged and located therearound.

* * * * *